J. C. LAUTENBACHER & A. GEARY.
SHOCK ABSORBER FOR AUTOMOBILES.
APPLICATION FILED DEC. 3, 1913.
1,098,271. Patented May 26, 1914.
2 SHEETS—SHEET 1.
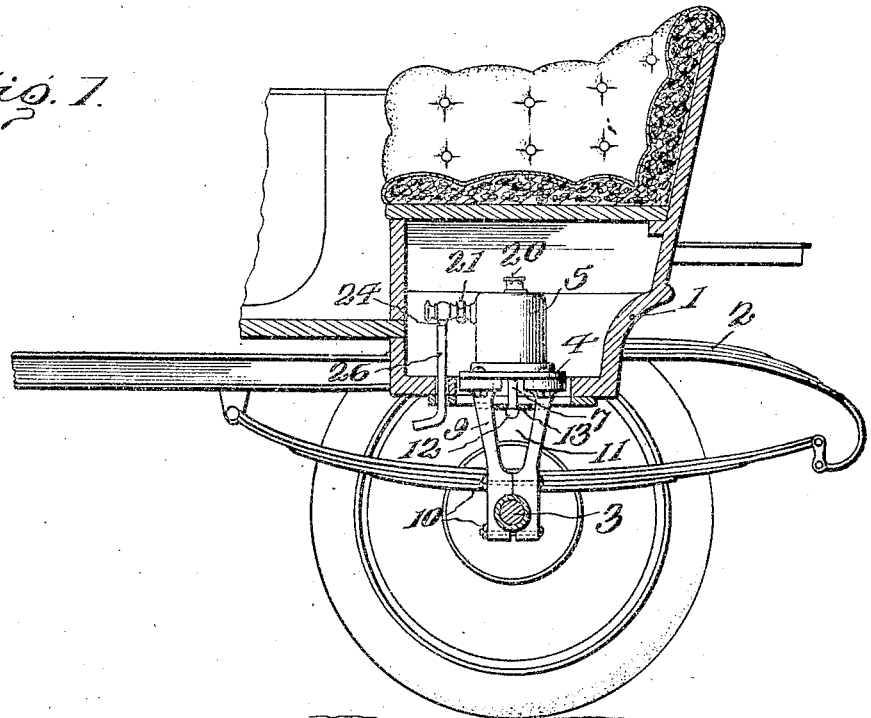
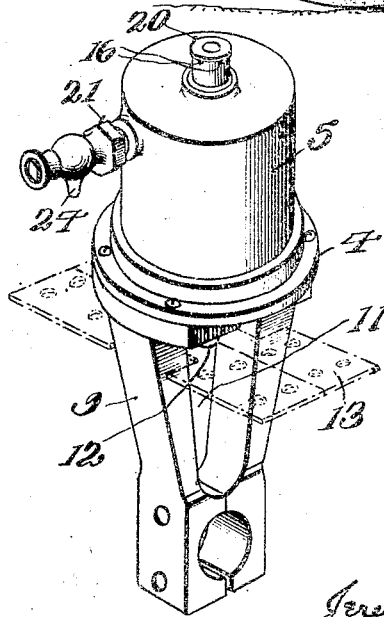

J. C. LAUTENBACHER & A. GEARY.
SHOCK ABSORBER FOR AUTOMOBILES.
APPLICATION FILED DEC. 3, 1913.
1,098,271.
Patented May 26, 1914.
2 SHEETS—SHEET 2.
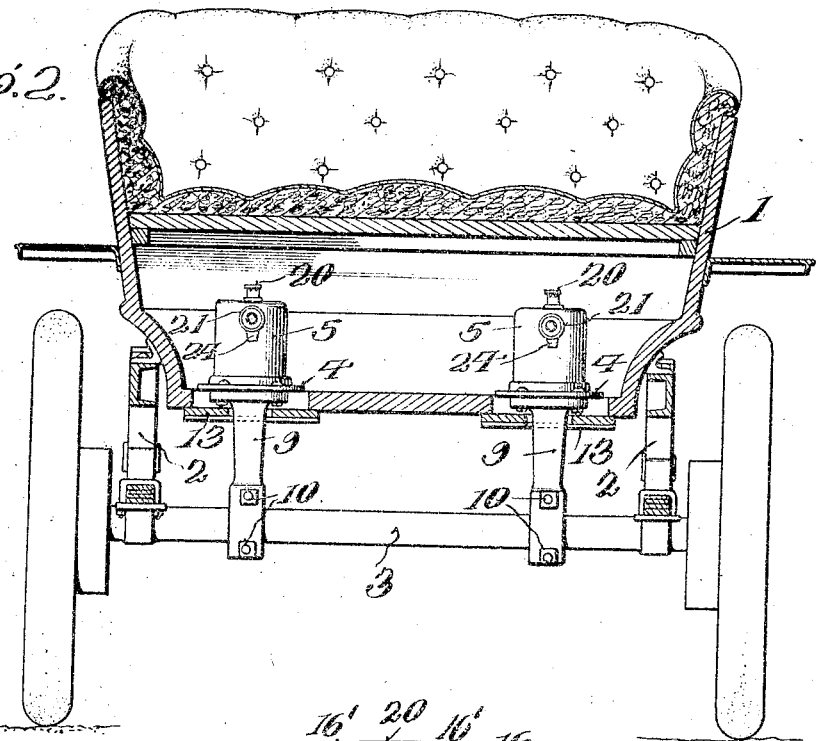
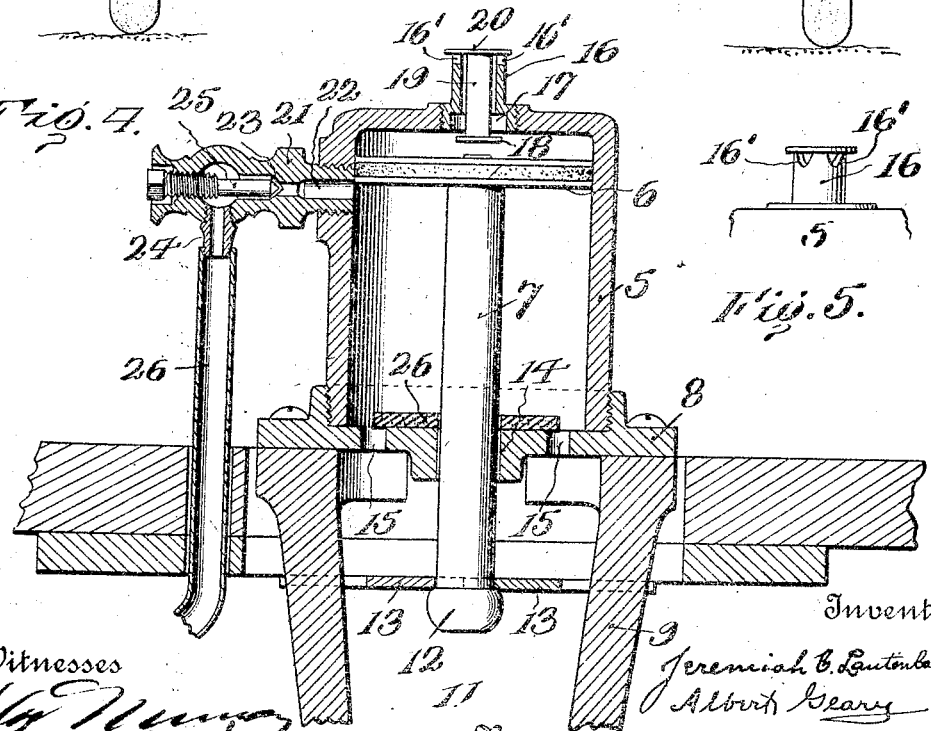

UNITED STATES PATENT OFFICE.

JEREMIAH C. LAUTENBACHER AND ALBERT GEARY, OF SCHUYLKILL HAVEN, PENNSYLVANIA.

SHOCK-ABSORBER FOR AUTOMOBILES.

1,098,271.  Specification of Letters Patent.  Patented May 26, 1914.

Application filed December 3, 1913. Serial No. 904,378.

*To all whom it may concern:*

Be it known that we, JEREMIAH C. LAUTENBACHER and ALBERT GEARY, citizens of the United States, residing at Schuylkill Haven, in the county of Schuylkill, State of Pennsylvania, have invented certain new and useful Improvements in Shock-Absorbers for Automobiles, of which the following is a description, reference being had to the accompanying drawing and to the figures of reference marked thereon.

The invention relates to new and useful improvements in shock absorbers for automobiles.

An object of the invention is to provide a shock absorber which is substantially ineffective to the downward movements of the body of the automobile, thus giving the springs their full elastic effect, and which operates to prevent a rebound of the automobile body, due to the reaction of the springs, whereby the upward movement of the automobile body, due to the returning of the springs to their normal position, is gradual.

A further object of the invention is to provide a shock absorber of the above type which may be readily adjusted to vary the control of the upward movement of the automobile body.

These and other objects will in part be obvious, and will in part be hereinafter more fully disclosed.

In the drawings which show by way of illustration one embodiment of the invention, Figure 1 is a longitudinal sectional view through the rear part of an automobile, showing the invention applied thereto—Fig. 2 is a transverse sectional view of the same; Fig. 3 is an enlarged detail in perspective showing one of the shock absorbers, detached from the machine; Fig. 4 is an enlarged vertical sectional view through the shock absorber; Fig. 5 is an enlarged detail of the upper end of the valve tube, which permits air to freely enter the cylinder.

The invention consists generally in providing an automobile body with a shock absorber, one element of which is attached either directly or indirectly to the axle of the running gear, while the other element of said shock absorber is attached to the body of the vehicle. There may be a number of these shock absorbers used, as, for example, two in the rear of the body of the vehicle and two adjacent the forward end of the body of the vehicle. Each of these shock absorbers includes a cylinder and a movable piston. The cylinder is preferably the element connected to the axle, while the piston is connected to the body of the vehicle. Adjacent the upper end of the cylinder is a valve controlled port, which is so constructed as to freely admit air to the cylinder on a downward movement of the piston, so that the downward movement of the piston is not retarded in any way, and thereby the full effect of the springs may be utilized. This valve which permits the air to freely enter the cylinder closes on the upward movement of the piston and prevents any air from passing through said port. Adjacent the upper end of the cylinder is an outlet which is controlled by a needle valve so that the size of the outlet may be varied. The air escapes from the cylinder through this outlet and permits the piston to rise slowly in the cylinder. The upward movement of the piston may be controlled by adjusting the needle valve.

Referring more in detail to the drawings, the automobile body is indicated more or less diagrammatically by the numeral 1. This automobile body is supported by springs 2, which may be of any desired type. The springs are attached either directly or indirectly to the automobile body, and are likewise attached to the axle 3 of the running gear. These parts may be of any desired construction.

Our improved shock absorber 4 consists of a cylinder 5, in which is a piston 6, rigidly attached to a piston rod 7. The cylinder 5 is threaded onto a base plate 8, which is fastened to a bracket 9. The bracket 9 is preferably formed in two sections, which are clamped about the axle 3 by suitable bolts 10. This two-part bracket provides a space 11 in which the piston rod may reciprocate. The piston rod is formed with an enlarged head 12 at its lower end. As herein shown, two plates 13 are fastened to the body 1 of the automobile, and these plates are formed with recesses to receive the piston rod. The recesses are preferably of such size as to engage the head 12 on the lower end of the piston rod, and any downward movement of the automobile body will force the piston rod downwardly, carrying the piston head therewith. The supporting plate 8 has a central opening 14 which serves as a guide for the piston rod. This plate also has openings 15, which provides free communication between the space underneath the piston head in the cylinder and the outer atmosphere.

At the upper end of the cylinder 5 there is an opening into which is threaded a short tube 16. This tube 16 is formed with notches 16' in its upper edge. Said tube is also formed with a valve seat 17 at its lower end. A valve 18 is carried by the stem 19 which is of smaller diameter than the tube 15. A disk 20 is mounted on the upper end of the valve stem. A downward movement of the piston head will cause the valve 18 to move from its seat and this movement of the valve is limited by the disk 20. When the disk 20 rests on the upper end of the tube 16, air will be freely admitted through the notches 16' and the space around the valve stem 19 to the upper part of the cylinder. This free inrushing of the air permits the piston head 6 to move directly with the automobile body without in any way restricting the full elastic movement of the spring. The cylinder 5 is also provided with an opening which receives a valve 21. The valve 21 has a passage 22 which is provided with a valve seat 23. Said valve has a discharge nozzle 24 and a needle valve 25 which coöperates with the seat 23. This needle valve can be adjusted relative to its seat for varying the size of the discharge passage through the valve. Some air may pass into the cylinder through this valve 21 on the downward movement of the piston. All the air passes out through said valve on the upward movement of the piston, which at once closes the valve 18. The rapidity with which the air is released from the cylinder depends upon the adjustment of the needle valve 25. As shown in Fig. 4, a pipe 26 may be associated with the discharge nozzle 24 so that the air discharged from the cylinder may be conducted through the pipe 26 to the radiator of the automobile to assist in air cooling the same. This pipe 26 will, of course, pass through an opening in the automobile body. The pipe is so arranged that the automobile body may move up and down on the same.

The operation of our device is as follows: When the wheels of the automobile strike an obstruction, the automobile body is free to move downward toward the axle of the wheels, compressing the springs 2. This downward movement of the automobile body is in no ways restricted by our shock absorber, a the pistons are free to move downward in the cylinder unrestricted. A rubber washer 26 may be located in each cylinder if desired to receive the shock of any excessive throw of the piston in the cylinders. The rebound of the automobile body on the returning of the springs to their normal position is, however, taken up by the shock absorber, as the air trapped in the cylinders above the piston heads is allowed to escape slowly through the needle valves 21, and, therefore, the automobile body and the springs will be gradually returned to their normal position. Furthermore, it will be noted that by my construction wherein the valve through which the air escapes is located at some distance below the upper end of the cylinder, a small amount of air will be trapped and cushion the piston so that when the parts have come to final resting position the weight of the body of the automobile so far as carried by the stem 7 of the piston is carried on an air cushion. The valve 18 is closed at this time.

While we have described a specific construction of shock absorber, and a particular arrangement of the same relative to the axle and body of the automobile, it will be understood that both the details of construction and the arrangement of the shock absorber may be varied without departing from the spirit of the invention, as set forth in the appended claims.

Having thus described our invention, what we claim is:

1. A shock absorber for automobiles comprising a vertically arranged cylinder, a piston movable in said cylinder, said cylinder having a valve controlled air escape port arranged horizontally in its vertical wall adjacent the upper end, and a separate valve control intake port in the upper face of the cylinder permitting air to enter freely into the cylinder above the piston, said valve control intake port including a tube secured in the upper end of said cylinder and with a valve seat adjacent the lower end of said tube with openings to the atmosphere adjacent the upper end of said tube, and a valve normally out of engagement with said seat but moved into engagement therewith by the upward movement of the piston.

2. A shock absorber for automobiles, comprising a cylinder, a piston movable in said cylinder, said cylinder having a valve controlled air escape port adjacent its upper end, and a separate valve controlled intake port which permits air to enter freely into said cylinder above the piston, said valve controlled intake port including a tube threaded into said cylinder and having a valve seat adjacent its lower end, and notches adjacent the upper end thereof, a valve adapted to engage said seat, a disk connected to said valve, and adapted to engage the upper notched edge of said tube.

3. A shock absorber for automobiles comprising a cylinder above the floor of the automobile body, a bracket extending through said floor and attached to the axle of the automobile, a piston located in said cylinder, a piston rod connected to said piston, means for attaching said piston rod to the automobile body, said cylinder having a valve controlled air escape port adjacent the upper end thereof, and a separate valve controlled intake port which permits air to enter freely into the cylinder above the piston when said piston is moving downwardly in the cylinder and which closes when said piston moves upwardly in the cylinder.

4. A shock absorber for automobiles, comprising a cylinder, a supporting plate carrying said cylinder, a bracket on which said supporting plate is mounted, said bracket being adapted to be connected to the axle of the automobile, a piston movable in said cylinder, a piston rod connected to said piston, said supporting plate having an opening through which said piston rod extends, means adapted to connect said piston rod to the body of the automobile, said cylinder having a needle valve controlled air escape port adjacent its upper end, a separate valve controlled intake port which permits air to enter freely into said cylinder and which prevents the air from escaping therethrough, said air intake port including a tube threaded into said cylinder and having a valve seat adjacent its lower end, a valve adapted to engage said seat, and means for supporting said valve, said tube having openings to permit free access of air to the cylinder when said valve is open.

5. A shock absorber for automobiles comprising a bracket secured to the axle thereof, a supporting plate attached to the bracket, said supporting plate having air openings and a central opening for guiding the piston rod, a piston rod, and a piston connected thereto movable in said cylinder, said cylinder having a needle valve controlled air escape port arranged in its vertical wall adjacent its upper end and having in its upper end a separate valve controlled intake port normally open to permit air to enter freely into said cylinder but which prevents the air from escaping therethrough in the movement of the piston in one direction.

In testimony whereof, we affix our signatures, in the presence of two witnesses.

JEREMIAH C. LAUTENBACHER.
ALBERT GEARY.

Witnesses:
  THOS. TINDLE,
  CHAS. W. CLIFF.